United States Patent
Doshi et al.

(10) Patent No.: US 9,251,164 B2
(45) Date of Patent: Feb. 2, 2016

(54) SYSTEM, METHOD AND COMPUTER PROGRAM PRODUCT FOR USING A DATABASE TO ACCESS CONTENT STORED OUTSIDE OF THE DATABASE

(75) Inventors: Kedar Doshi, Palo Alto, CA (US);
Sonali Agrawal, San Calros, CA (US);
Simon Wong, San Carlos, CA (US);
Chaitanya Bhatt, Fremont, CA (US);
Sandip Ghosh, San Francisco, CA (US);
Gary Baker, San Francisco, CA (US);
Walter Macklem, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 139 days.

(21) Appl. No.: 13/037,240

(22) Filed: Feb. 28, 2011

(65) Prior Publication Data

US 2011/0213816 A1    Sep. 1, 2011

Related U.S. Application Data

(60) Provisional application No. 61/308,747, filed on Feb. 26, 2010, provisional application No. 61/319,782, filed on Mar. 31, 2010, provisional application No. 61/320,194, filed on Apr. 1, 2010.

(51) Int. Cl.
*G06F 17/30* (2006.01)

(52) U.S. Cl.
CPC ........ *G06F 17/30194* (2013.01); *G06F 17/301* (2013.01); *G06F 17/30082* (2013.01); *G06F 17/30091* (2013.01); *G06F 17/30156* (2013.01); *G06F 17/30165* (2013.01)

(58) Field of Classification Search
None
See application file for complete search history.

(56) References Cited

U.S. PATENT DOCUMENTS

| | | | |
|---|---|---|---|
| 5,421,009 A * | 5/1995 | Platt | 709/221 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |

(Continued)

OTHER PUBLICATIONS

U.S. Appl. No. 60/828,192, filed Oct. 4, 2006.

(Continued)

*Primary Examiner* — Charles Adams
(74) *Attorney, Agent, or Firm* — Zilka-Kotab, PC

(57) ABSTRACT

In accordance with embodiments, there are provided mechanisms and methods for using a database to access content stored outside of the database. These mechanisms and methods for using a database to access content stored outside of the database can enable embodiments to provide a database system which can be used to access content when the content is incapable of being stored in the database system, or is otherwise not stored in the database system. The ability of embodiments to provide access to such data via the database system can improve the usability of the database system.

25 Claims, 12 Drawing Sheets

(56) References Cited

U.S. PATENT DOCUMENTS

| | | | |
|---|---|---|---|
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,484,161 B1* | 11/2002 | Chipalkatti et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,587,855 B1* | 7/2003 | Ellmann et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,615,219 B1* | 9/2003 | Bruso et al. | 707/699 |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,694,331 B2* | 2/2004 | Lee | 707/706 |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,779,039 B2 | 8/2010 | Weissman et al. | |
| 7,970,743 B1* | 6/2011 | Kilday et al. | 707/689 |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2001/0047400 A1* | 11/2001 | Coates et al. | 709/219 |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0147733 A1* | 10/2002 | Gold et al. | 707/200 |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0041719 A1* | 2/2006 | Chui et al. | 711/117 |
| 2006/0112142 A1* | 5/2006 | Sako et al. | 707/104.1 |
| 2006/0195465 A1 | 8/2006 | Atchison et al. | |
| 2006/0206834 A1 | 9/2006 | Fisher et al. | |
| 2007/0091376 A1* | 4/2007 | Calhoon et al. | 358/3.28 |
| 2007/0271316 A1* | 11/2007 | Hollebeek | 707/204 |
| 2008/0162491 A1* | 7/2008 | Becker et al. | 707/10 |
| 2008/0172608 A1* | 7/2008 | Patrawala et al. | 715/255 |
| 2008/0249972 A1 | 10/2008 | Dillon | |
| 2008/0263103 A1* | 10/2008 | McGregor et al. | 707/200 |
| 2008/0263113 A1* | 10/2008 | Krishnaiyer et al. | 707/205 |
| 2009/0006425 A1* | 1/2009 | Barsness et al. | 707/100 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0017703 A1* | 1/2010 | Glickman et al. | 715/234 |
| 2010/0186082 A1* | 7/2010 | Ladki et al. | 726/19 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2013/0218948 A1 | 8/2013 | Jakobson | |
| 2013/0218949 A1 | 8/2013 | Jakobson | |
| 2013/0218966 A1 | 8/2013 | Jakobson | |

(56) References Cited

U.S. PATENT DOCUMENTS

| | | |
|---|---|---|
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |

OTHER PUBLICATIONS

Non-Final Office Action from U.S. Appl. No. 13/866,855, dated Jan. 17, 2014.

Final Office Action from U.S. Appl. No. 13/866,855, dated Jul. 30, 2014.

* cited by examiner

Objects » Projects » Fields » Update Custom Field

Basic Information

Label: RTA Field
Display Type: Rich Text Area
Width: 550
Default Value: <b>Test</b>
Field Name: rta_field

Subject Permission Codes

System Administrator: Visible
Team Manager: Visible
Team Member: Visible

Description Information

Description:

FIGURE 5F

SYSTEM, METHOD AND COMPUTER PROGRAM PRODUCT FOR USING A DATABASE TO ACCESS CONTENT STORED OUTSIDE OF THE DATABASE

CLAIM OF PRIORITY

This application claims the benefit of U.S. Provisional Patent Application 61/308,747 entitled "File Fields," by Doshi et al., filed Feb. 26, 2010; U.S. Provisional Patent Application 61/319,782 entitled "Rich Text Area Fields," by Agrawal et al., filed Mar. 31, 2010; and U.S. Provisional Patent Application 61/320,194 entitled "Method And System For Managing Images In Rich Text Area Fields," by Ghosh et al., filed Apr. 1, 2010; the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to accessing content using a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, a type of data capable of being stored in such database systems is limited. For example, each field of a database may be configured to store only a particular type of data. In some cases, the particular type of data may be customized for all fields in a column of the database. Unfortunately, conventional database systems have been limited in their ability to store some types of data, such as rich text, files, and images. For example, rich text, files, and images have generally exceeded the allowable size for data being stored in a single field of a database.

Accordingly, it is desirable to provide techniques enabling a database system to be utilized to access content stored outside of the database system to improve the usability of the database system.

BRIEF SUMMARY

In accordance with embodiments, there are provided mechanisms and methods for using a database to access content stored outside of the database. These mechanisms and methods for using a database to access content stored outside of the database can enable embodiments to provide a database system which can be used to access content when the content is incapable of being stored in the database system, or is otherwise not stored in the database system. The ability of embodiments to provide access to such data via the database system can improve the usability of the database system.

In an embodiment and by way of example, a method for using a database to access content stored outside of the database is provided. In use, content is received. Additionally, the content is stored in a file server. Further, metadata referencing a location of the content in the file server is stored in a database. Still yet, the content is accessed using the metadata.

While one or more implementations and techniques are described with reference to an embodiment in which using a database to access content stored outside of the database is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 5A-5F are screen shots illustrating examples of a user interface screen capable of being used to configure a database to reference content stored outside of the database, in accordance with an embodiment;

DETAILED DESCRIPTION

General Overview

Systems and methods are pr vided for using a database to access content stored outside of the database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for using a database to access content stored outside of the database will be described with reference to example embodiments.

Figure 1:
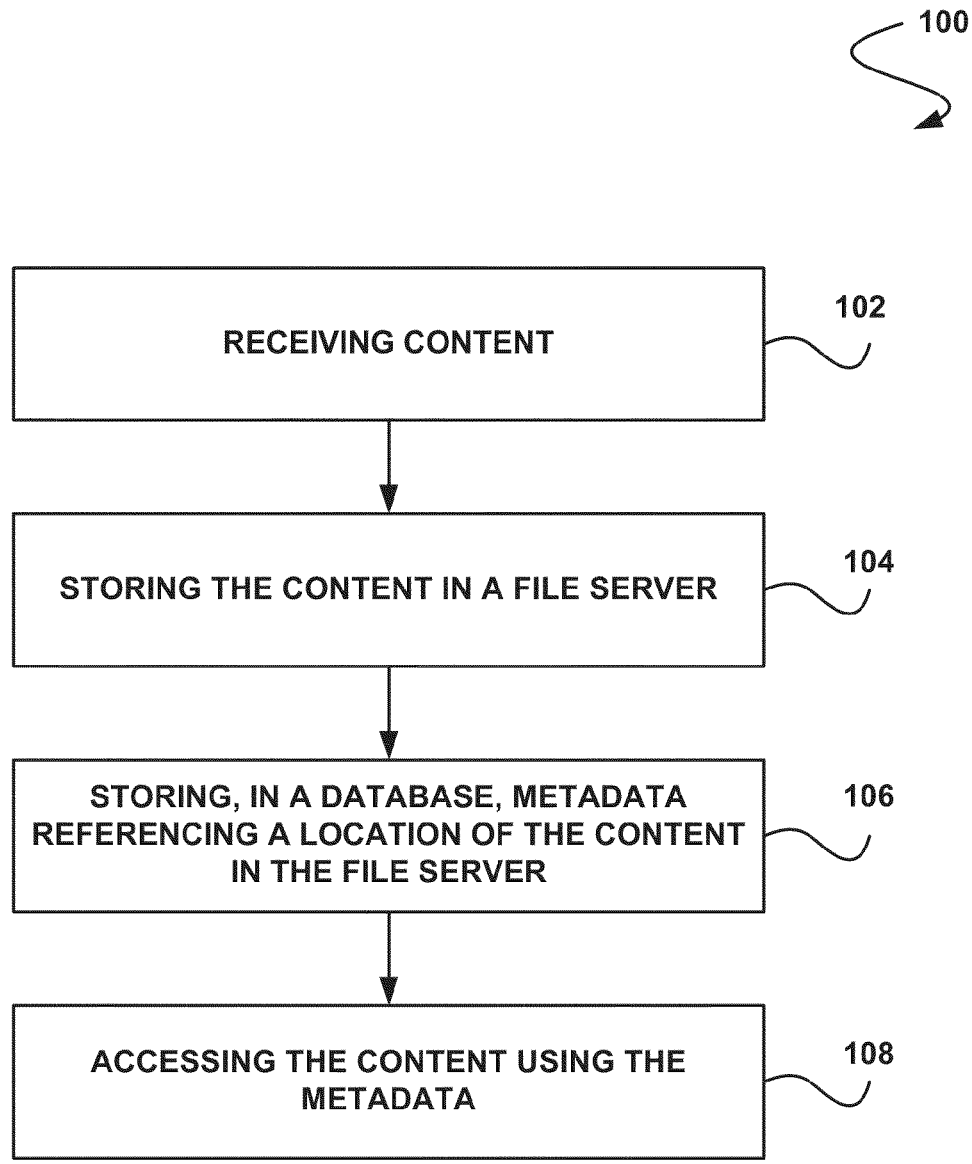
FIG. 1 illustrates a method for using a database to access content stored outside of the database, in accordance with an embodiment.

FIG. 1 illustrates a method 100 for using a database to access content stored outside of the database, in accordance with an embodiment. As shown in operation 102, content is received. In the context of the present embodiment, the content may include a file (e.g. an image file or any other type of file), rich text, or any other content which is incapable of being stored in a database or otherwise for which it is undesired that the content be stored in the database. For example, the content may of a size that is larger than an allowable size for fields of the database.

In one embodiment, the content may be received by a multi-tenant on-demand database system for storage thereof by the multi-tenant on-demand database system. For example, the content may be received from a tenant of the multi-tenant on-demand database system. Thus, the multi-tenant on-demand database system may receive the content for storage in association with the tenant.

In another embodiment, the content may be received using a graphical user interface used for configuring an entity associated with the tenant (e.g. an entity created by the tenant, used by the tenant, etc. via the multi-tenant on-demand database system). Such entity may include a webpage, just by way of example. To this end, the content may be received for being included in the entity.

Additionally, as shown in operation 104, the content is stored in a file server. The file server may include any file system capable of storing the file. For example, the file server may include a device of the multi-tenant on-demand database system. In one embodiment, the file server may be selected from a plurality of file servers, based on the tenant from whom the content is received. For example, a file server associated with a particular partitioning in which the tenant is included may be selected for storing the content.

Further, as shown in operation 106, metadata referencing a location of the content in the file server is stored in a database. In the context of the present description, the database may be separate from the file server. In particular, the database may optionally be the aforementioned database which is incapable of storing the content, or in which it is otherwise undesirable to store the content.

In one embodiment, the database may store information associated with the entity (e.g. webpage) in which the content is to be included. For example, the database may store text to be included in the entity, a formatting associated with the entity, etc. Accordingly, the metadata referencing the location of the content in the file server may be stored in the database, instead of storing the content itself in the database.

It should be noted that the metadata may be stored in the database in any desired manner for referencing the location of the content. For example, an address in memory of the file server at which the file is stored may be used in the database to reference the location of the content. Such location reference may be stored in a field of a table of the database in which the file would otherwise be stored, as an option. In one embodiment, an identifier of the location of the content may be stored in a reference table of the database.

Still yet, as shown in operation 108, the content is accessed using the metadata. The access may include reading the content, writing to the content (e.g. to modify the content), etc. For example, accessing the content may include retrieving the content for inclusion in the entity (e.g. webpage), such that the entity including the content may be provided to a user requesting the entity.

In one embodiment, the content may be accessed by directly accessing the metadata. Just by way of example, in response to a request for the entity or directly for the content, the portion of the database storing the metadata may be directly queried to identify the location of the content Once the location is identified, the content may be accessed using the identified location.

In another embodiment, the content may be accessed by indirectly accessing the metadata. As noted above, the metadata referencing the location of the content (i.e. identifier of the location of the content) may be stored in a reference table of the database. Furthermore, the metadata may be stored (e.g. in the reference table) in association with a content identifier (i.e. a unique identifier of the content).

Still yet, the content identifier may point to a record of a field data table storing a reference identifier. For example, the content identifier may also be stored in the field data table in association with the reference identifier. Thus, the content identifier from the reference table may point to the content identifier in the field data table.

Moreover, the reference identifier may point to a record of an entity table storing the reference identifier. For example the reference identifier may also be stored in the entity table. To this end, the reference identifier in the field data table may point to the reference identifier in the entity table. Such entity table may store the above described information associated with the entity including the content, in one embodiment.

To this end, the reference identifier may be stored in a field of a record of the entity table, for referencing the content. Such field may optionally be configured to store a type of the content, in one embodiment According to the above described schema of tables, access to the content may be provided through the entity table, the field data table, and the reference table. For example, the reference identifier may be identified in the entity table, which may point to a record of the field data table for identifying an associated content identifier, which may further point to a record of the reference table for identifying the identifier of the location of the content.

Once the identifier of the location of the content is determined, such identifier may be used to access the content from the file server. In this way, the database may be used to identify the content, without the database necessarily storing the content.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
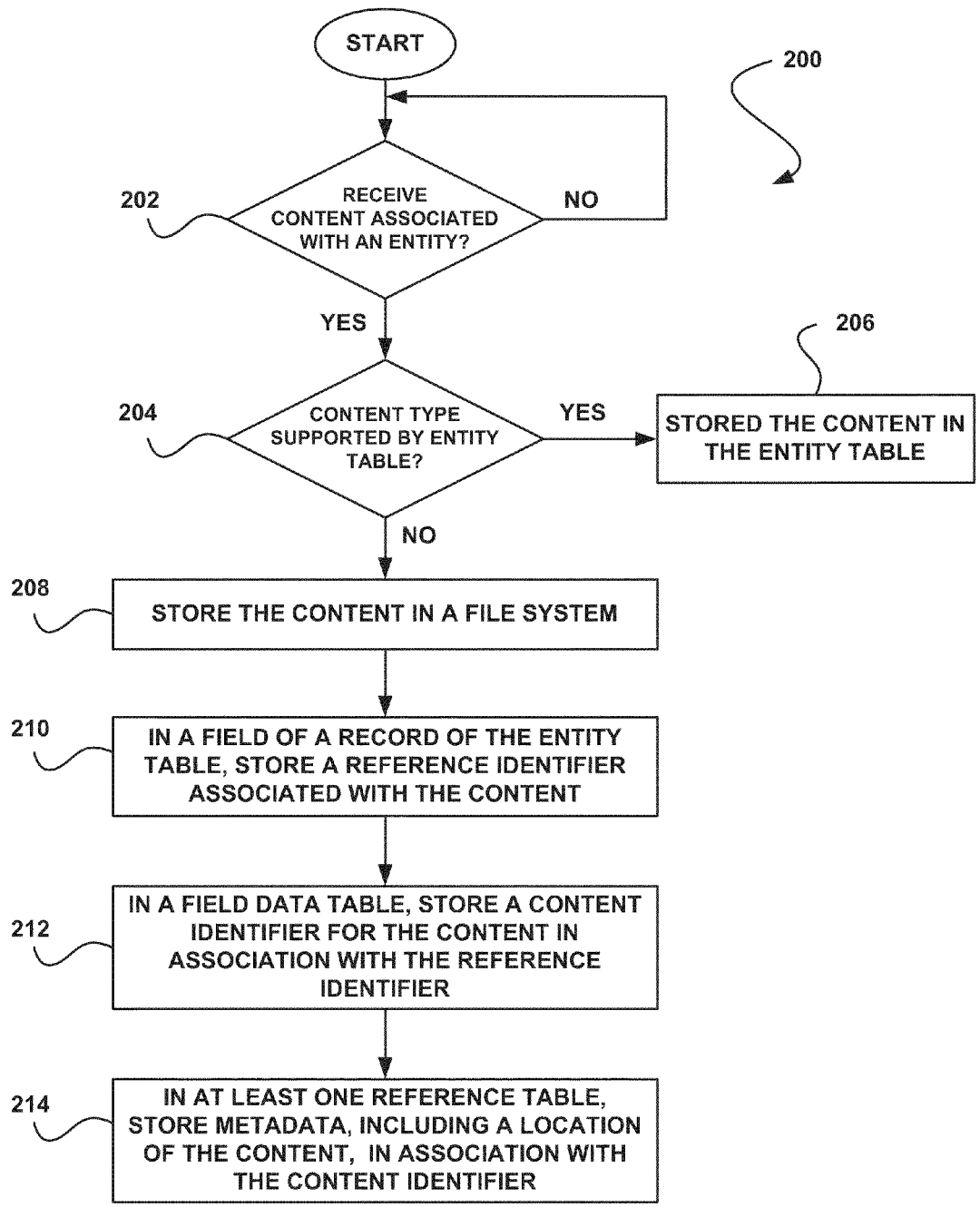
FIG. 2 illustrates a method for configuring a database to reference content stored in a file system, in accordance with an embodiment.

FIG. 2 illustrates a method 200 for configuring a database to reference content stored in a file system, in accordance with an embodiment. As an option, the present method 200 may be carried out in the context of the functionality of FIG. 1. For example, the method 200 may be carried out by the multi-tenant on-demand database system described herein. Of course, however, the method 200 may be carried out in any desired environment. Again, the aforementioned definitions may apply during the present description.

As shown in decision 202, it is determined whether content associated with an entity is received. For example, it may be determined whether content has been uploaded by a tenant of a multi-tenant on-demand database system (e.g. using a GUI of the multi-tenant on-demand database system). As another example, it may be determined whether content has been saved by the tenant to the multi-tenant on-demand database system (e.g. for storage by the multi-tenant on-demand database system).

In the context of the present embodiment, the content may include any content which is to be associated with an entity (e.g. of the tenant). For example, the content may be received by the tenant for use in configuring the entity (e.g. a webpage). Accordingly, the content may include text, an image, etc.

If it is determined that content has not been received, the method 200 continues to wait for such content to be received. However, once it is determined that content has been received, it is further determined whether a type of the content is supported by an entity table. Note decision 204. The entity table may include a table of a database storing information for configuring at least one entity.

In one embodiment, the entity table may be incapable of storing (i.e. may not necessarily support) content of particular types, such as rich text, a file, an image, content greater than a predetermined length (e.g. 255 characters), etc. Thus, determining whether a type of the content is supported by an entity table may include determining whether the content is one of the unsupported types. If it is determined that the content type is supported by the entity table, the content is stored in the entity table, as shown in operation 206. For example, the content may be stored in a record specific to the entity with which the content is associated (i.e. a record having an identifier of the entity). Further, the content may be stored in a field of such record that is configured (e.g. by an administrator, etc.) to store the type of the content.

As an option, the field may be automatically filtered for at least potentially malicious content. For example, if potentially malicious content is identified, then the potentially malicious content should be automatically removed or transformed into a non-malicious format (e.g. text) for users who view the field. The content may be determined to be potentially malicious if the content includes hypertext transfer markup language (HTML) tags that are not supported by the database (i.e. are not whitelisted), cascading style sheets (CSS), contents of <script> and <iframe> tags, javaScript, etc.

If it is determined that the content type is not supported by the entity table, the content is stored in a file system. Note operation 208. Such file system may include any system that is separate from the database and that is capable of storing the content. As an option, the file system may store content for a plurality of different tenants of the multi-tenant on-demand database system. As another option, the file system may store content for only a subset of all tenants of the multi-tenant on-demand database system (e.g. whether other file systems store content for the remaining tenants, such that the tenants are partitioned across multiple file systems).

In one embodiment, the content may be stored in the file server in response to a determination that the content does not include malicious content. For example, the content may be analyzed to ensure that the content does not include JavaScript (which is capable of being malicious), prior to storing the content in the file server. Of course, any security mechanism may be utilized to ensure that content being stored in the file system is not malicious. As an additional security mechanism, the content may optionally only be stored in the file server (operation 208)/database (operation 206) in response to a determination that a user requesting the storage has permission to save content.

Moreover, as shown in operation 210, a reference identifier associated with the content is stored in a field of a record of the entity table. In one embodiment, the record may include a record specific to the entity with which the content is associated. For example, the record may include an identifier of the entity. In another embodiment, the field of the record may include a field that is configured (e.g. by an administrator, etc.) to store references for the type of the content.

It should be noted that in the context of the present embodiment, the reference identifier may include an identifier or other code which references the content. Furthermore, as shown in operation 212, a content identifier for the content is stored in a field data table (e.g. of the database) in association with the reference identifier. For example, the field data table may include record storing the reference identifier in one field and the content identifier in another field. To this end, the reference identifier may be identified in the entity table and used to query the field data table for the associated content identifier.

Still yet, metadata, including a location of the content, is stored in at least one reference table (e.g. of the database), in association with the content identifier. Note operation 214. To this end, the metadata may include an identifier of the location of the content, such as an address in the file system at which the content is stored. For example, a record of the reference table may store the content identifier and the associated metadata. In this way, the content identifier may be identified from the field data table (as described above) and used to query the reference table for the identifier of the location of the content. The identifier of the location of the content may then be used to retrieve the content from the file system whenever a request for the content is issued.

As an option, the reference table may also store (in association with the content identifier) an indicator of a number of different reference identifiers associated with the content identifier. For example, the record of the reference table storing the metadata and the content identifier may also store a count of a number of different reference identifiers associated with the content identifier. In one embodiment, such number may be determined from the field data table by counting a number of occurrences of the content identifier across the records of the field data table. The number may optionally be updated periodically (e.g. by counting a number of occurrences of the particular reference identifier stored in the entity table or by updating the count based on a logged number of insertions of the reference identifier in the reference table) or upon storage of the reference identifier in a record of the entity table.

The indicator of the number of different reference identifiers associated with the content identifier may then be used for determining whether to delete the content from the file server. For example, upon a deletion of a reference identifier from the entity table (e.g. upon a tenant requesting deletion of the content from the entity or deletion of the record storing the reference identifier from the entity table), the reference table may be updated to reflect one less reference identifier in the associated count. The count may then be queried to determine whether any other reference identifiers are associated with the content identifier (i.e. if the count is greater than zero).

If there is at least one other reference identifier associated with the content identifier, the content may be prevented from being deleted from the file system. If, however, there is not any other reference identifiers are associated with the content identifier, the content may be deleted from the system. Of course, it should be noted that such query of the count may also be initiated periodically, for example, by determining from a log whether the content has been deleted from an entity (e.g. instead of only upon a deletion of a reference identifier from the entity table).

Figure 3:
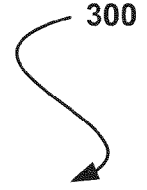
FIG. 3 illustrates tables of a database system configured to reference content stored outside of the database, in accordance with an embodiment.

FIG. 3 illustrates tables of a database system 300 configured to reference content stored outside of the database, in accordance with an embodiment. As an option, the database system 300 may be implemented in the context of the functionality of FIGS. 1-2. For example, the database system 300 may be implemented by the multi-tenant on-demand database system described herein. Of course, however, the database system 300 may be implemented in any desired environment. Again, the aforementioned definitions may apply during the present description.

As shown, each record of an entity table stores a tenant identifier (ORG ID), an entity identifier (ETD) indicating an entity with Which the record is associated. For each record, a plurality of fields (FIELD 1 ... N) may store data for the entity associated with the record. For example, the data may be used to configure the entity. Optionally, each of the fields may be configured to store a particular type of data.

In the present embodiment, each of the record shown in the entity table stores a reference identifier (FFID1, FFID2 respectively) to content stored in the entity table for an associated entity. Additionally, a field data table also stores in each record a tenant identifier (ORG ID), and at least one field including a reference identifier (FFID1, FFID2). In association with the reference identifier (FFID1, FFID2), a content identifier (CRID_X) is stored. In the present embodiment shown, each of the reference identifiers (FFID1, FFID2) is associated with a same content identifier, indicating that each of the reference identifiers (FFID1, FFID2) references the same content in a file system.

A record of the reference table stores the content identifier (CRID_X) and metadata associated therewith. As shown, the metadata includes an identifier of a location (XXXX) of the content identified by the content identifier. Thus, in response to a request to access the content, the database system 300 shown may be utilized as follows to grant the access: identify the reference identifier associated with the content from the entity table, identify from the field data table the content identifier associated with the reference identifier, identify from the reference table the identifier of the location of the content associated with the content identifier, and retrieve the content from the file system using the identifier of the location of the content.

The record of the reference table also stores a count of a number of reference identifiers (FFID1, FFID2) associated with the content identifier, which are stored in the field data table. This count may be used to determine when no references to the content exist in the database system 300, such that the content may be deleted from the file system.

Furthermore, a record of a content table stores, in association with the content identifier (CRID_X), other metadata associated with the content. For example, such metadata may include a name of the content, a body of the content, a type of the content, a length of the content, etc. Thus, as an option, information associated with the content may be retrieved from the content table, using the reference identifier associated with the content, instead of determining the information from the content itself each time the information is requested (e.g. by a tenant, etc.).

In one embodiment, a query may be used to access the metadata. For example, if a user submits the query "select myFileField_contentType, myFileField_length from myObject", the user's query may be translated into a query statement (i.e. in a query language) to generate a statement that joins the entity table with the field data table with the reference table with the content table to retrieve the content type column and the length column, without reading the actual stored content (e.g. the file contents). To this end, a query may be used to retrieve or filter by the metadata fields of the content table.

As a further option, the metadata may also include a flag indicating whether a type of the content has been changed. For example, a tenant may request that the content be converted from a first format to a second format (and thus a field storing the content be converted from being configured to store content of the first format to be configured to store content of the second format), such as from a long text area format to a rich text area format. In response to the conversion, a flag may be set in the metadata. If the converted content is changed back to its original format (e.g. from rich text area format to long text area format), the flag may be removed from the metadata. Of course, it should be noted that the metadata described above with respect to the content table may instead be stored in the reference table, in another embodiment (e.g. such that the content table may not necessarily exist in the database system 300).

In some embodiment, the content may be incapable of being converted, so any conversion of the content may result in a conversion of the configuration of the field, but a loss of the content. Optionally, converting content from a rich text area type to a plain text type may finding all data rows for the entity that have a non-null value for the associated field, parse to strip out all the rich text area [e.g. hypertext transfer markup language (HTML)] tags and formatting, truncating the result to 255 character, and converting a maximum length for the field to 255, and similarly converting a default value associated with the field to the text type. A similar conversion may be used when converting to a text area type and/or uniform resource locator (URL) type.

Figure 4:
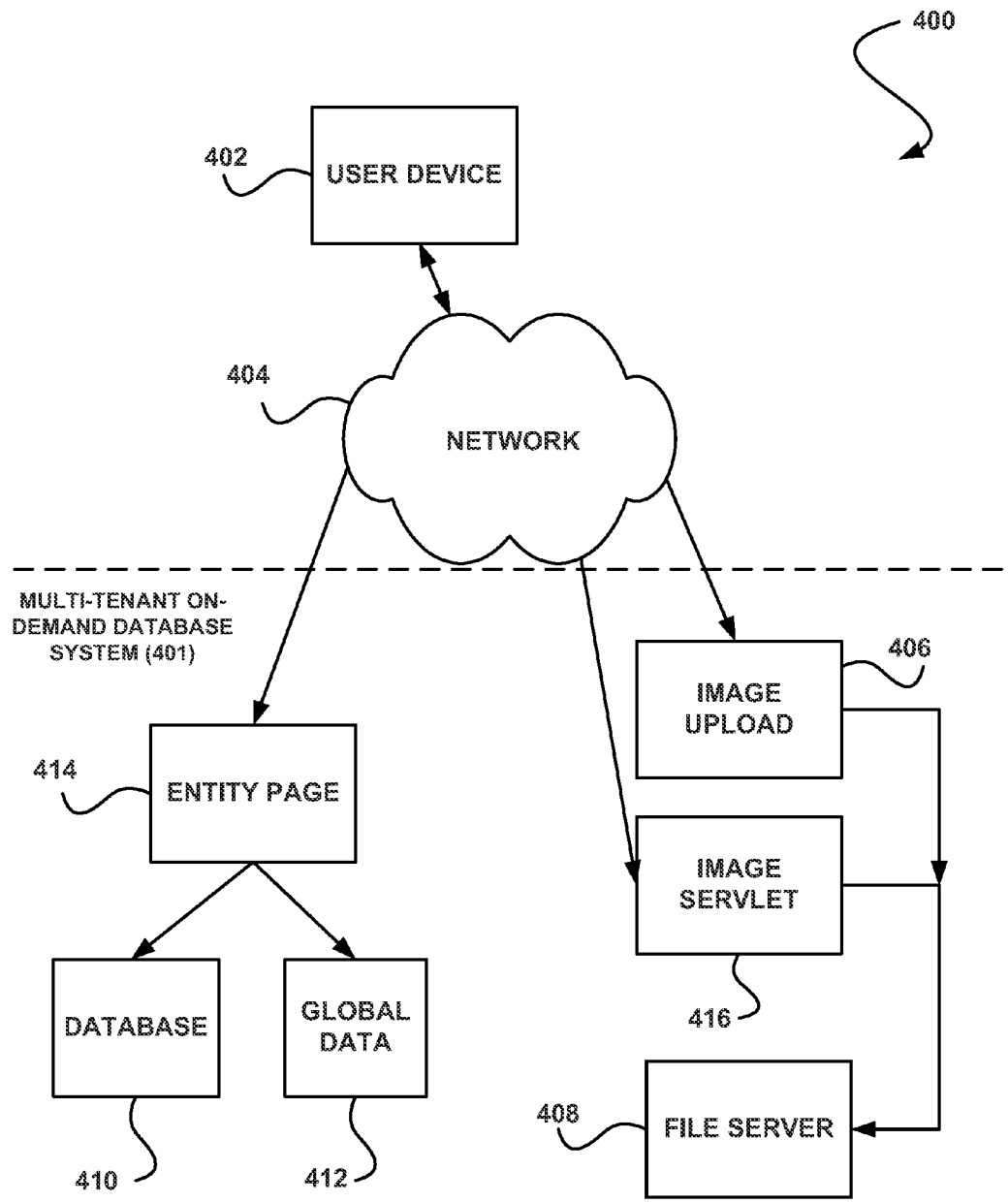
FIG. 4 illustrates a system for using a database to access content stored outside of the database, in accordance with an embodiment.

FIG. 4 illustrates a system 400 for using a database to access content stored outside of the database, in accordance with an embodiment. As an option, the system 400 may be implemented in the context of the functionality of FIGS. 1-3. Of course, however, the system 400 may be implemented in any desired environment. Again, the aforementioned definitions may apply during the present description.

Saving Content to the Multi-Tenant On-Demand Database System

As shown, a user device 402 uploads or otherwise sends content to a multi-tenant on-demand database system 401 via a network 404. The user device 402 may include a computer of a tenant of the multi-tenant on-demand database system 401, for example. The content is sent from the user device 402 with a request to store the content in association with an entity created within the multi-tenant on-demand database system 401. In the present embodiment, such entity is an entity page 414 (e.g. webpage) of the tenant and the content is an image. It should be noted, however, that any entity and associated content may be utilized in at least a similar context as that described herein.

In response to receipt of the image, the method 200 of FIG. 2 may be carried out by an image upload 406 module (e.g. application) for storing the image in the multi-tenant on-demand database system 401. For example, if the image is of a type capable of being stored by a database 410, the image may be stored in the database 410. Optionally, global data 412 may store information associated with various content types (e.g. a format of the content types, etc.), such that storage of the image in the database 410 may include storing the image in a field of the database configured to store a type of the content (i.e. an image or a type of the image), where such configuration is performed using the global data 412. If, however, the content is of a type incapable of being stored by the database 410, the content may be stored in a file server 408. It should be noted that in one embodiment the database 410 may take the form of the database system 300 shown in FIG. 3.

In one exemplary embodiment, receiving an image for storage and retrieving the image from storages may include the following steps shown in Table 1. Of course, the steps shown in Table 1 are set forth for illustrative purposes only and should not be construed as limiting in any manner.

TABLE 1

1. A HTTP POST request to the image servlet 316 from the user device 302 passing the image contents as multi-part form data.
2. Upload the file to the server and insert a record in a reference table with USE_COUNT = 0 and invoke the entity save logic for a content table which will insert a record in the content table and insert the image file in the file server 308.
3. The image servlet 316 will return a response: if the image is successfully uploaded a response to the user device will include the URL to another servlet, with the parameters required to retrieve the image from the file server 308; if the upload fails then an error message will be returned to the user device 302.
4. The user device 302 will insert an image tag into a rich text editor of a GUI displayed via a browser of the user device 302, for referencing the URL.
5. The browser of the user device 302 will make a request to the image servlet 316 which will retrieve the meta-data associated with the image from the content table and reference table. This meta-data will include the file server 308 locator (and optionally version identifier) to retrieve the image from the file server 308.

As an option, the multi-tenant on-demand database system 401 may regulate an amount of content allowed to be stored by each tenant. For example, a threshold may be configured for each tenant indicating the maximum amount (e.g. size) of total content allowed to be stored in the multi-tenant on-demand database system 401 by a particular tenant. In one embodiment, each separate reference to a single piece of content may not necessarily be individually counted against the threshold. Thus, instead only the single piece of content stored in the file server 408 may count against the threshold. In another embodiment, if multiple tenants reference the same content, the storage of the content may be counted against the tenant who first stored a reference to the content.

Retrieving Content from the Multi-Tenant on-Demand Database System

In response to a request from the user device 402 for the entity page 414, it may be confirmed that the user of the user device 402 has permissions to access the entity page 414. For example, such permissions may be configured by the multi-tenant on-demand database system 401. In response to a determination that the user has permissions to access the entity page 414, the image may be retrieved from the multi-tenant on-demand database system 401 for inclusion in the entity page 414, such that display of the entity page 414 to the user of the user device 402 includes the image.

Such retrieval may be performed using an image servlet 416 of the multi-tenant on-demand database system 401. If the image is stored in the database 410, the image servlet 416 may query the database 410 for the image (note, communication direction is not shown between image servlet 416 an database 410). If, however, the image is stored in the file server 408, then a reference to the image stored in the database 410 may be used to retrieve the image from the file server 408. In particular, metadata referencing the location of the image in the file server 408 may be identified and used to retrieve the image from the identified location in the file server 408 (e.g. as described above with respect to the database system 300 of FIG. 3).

FIGS. 5A-5F are screen shots illustrating examples of a user interface screen capable of being used to configure a database to reference content stored outside of the database, in accordance with an embodiment. As an option, the screen shots may be provided in the context of the functionality of FIGS. 1-4. For example, the screen shots may be provided by the multi-tenant on-demand database system described herein. Of course, however, the screen shots may be provided in any desired environment. Again, the aforementioned definitions may apply during the present description.

Figure 5A:
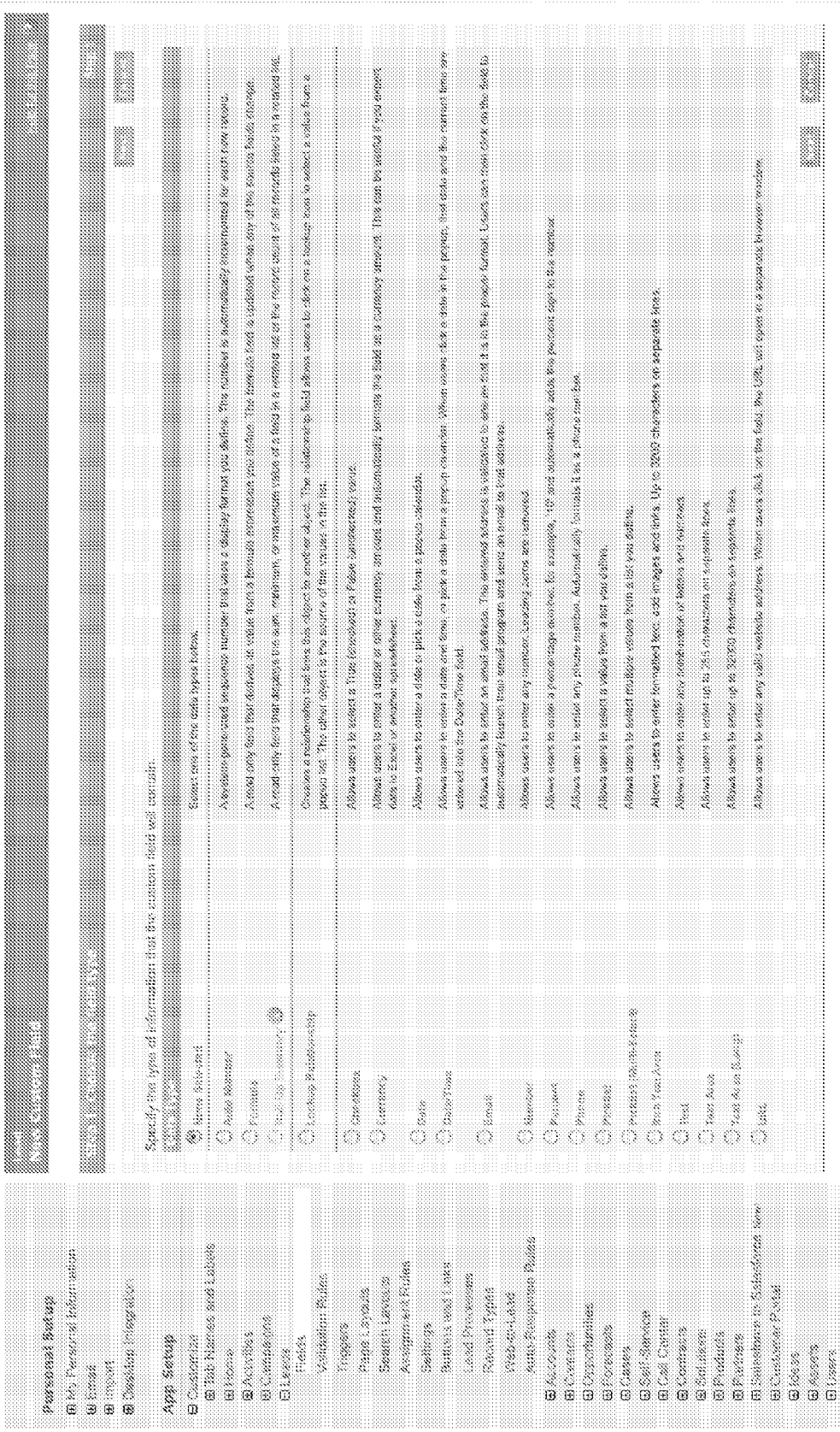

As shown in FIG. 5A, a field of a table in a database may be configured to store content of a particular type. Such table may include the entity table described above with reference to FIG. 3, for example. The screenshot of FIG. 5A highlights that a field may be configured to store content that is of a rich text area type. Of course, in other embodiments, the field may be configured to store content that is of a file type, an image type, etc.

Figure 5B:
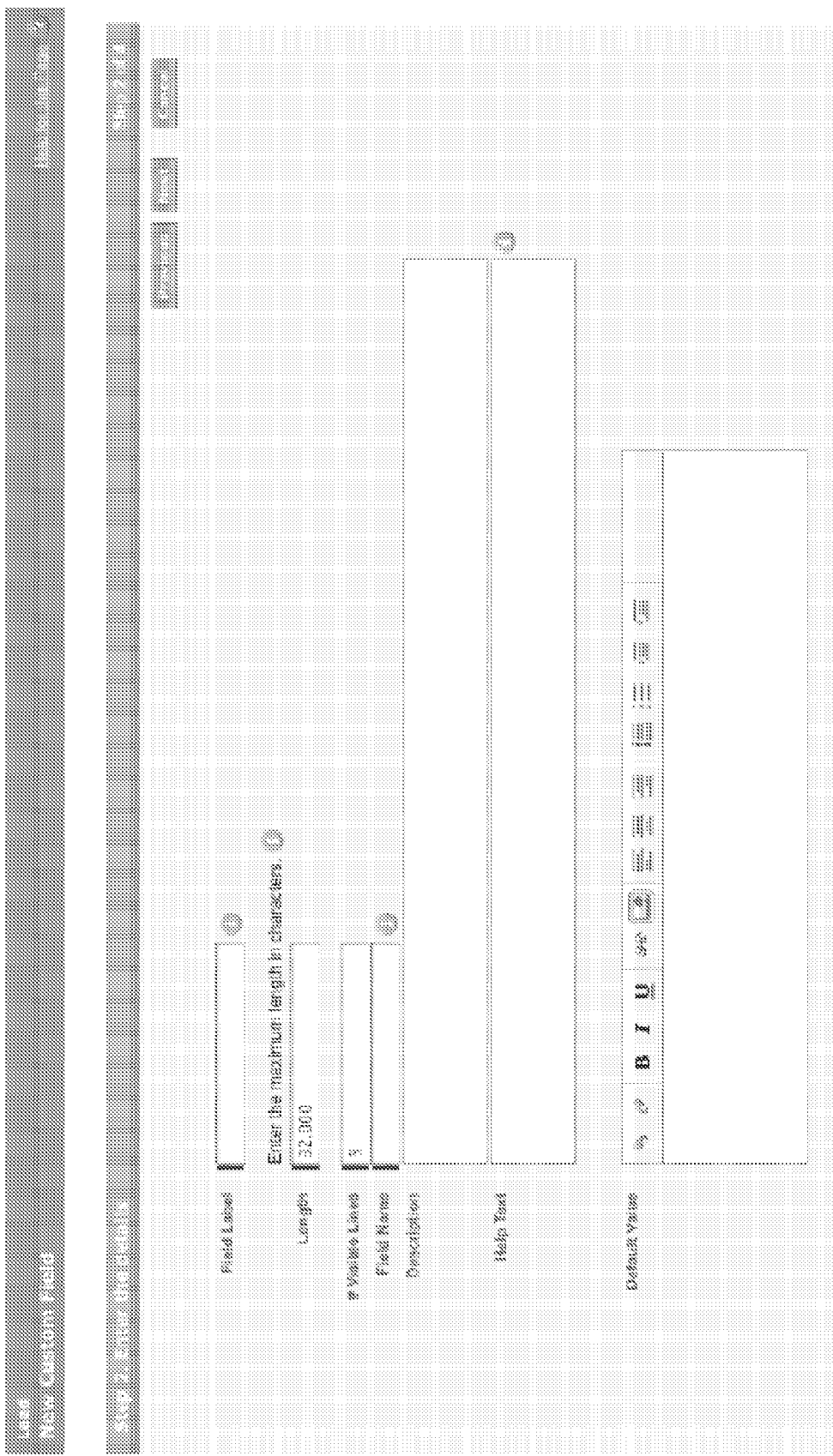

As shown in FIG. 5B, details for the field configured in FIG. 5B may be entered. The details may include an identifier of the field (Field Label), a maximum allowed length for data stored in the field, a number of visible lines included in the field, a name of the field, a description of the field, help text associated with the field, and a default value to be stored in the field (e.g. which may be of the type of content for which the field is configured).

Figure 5C:
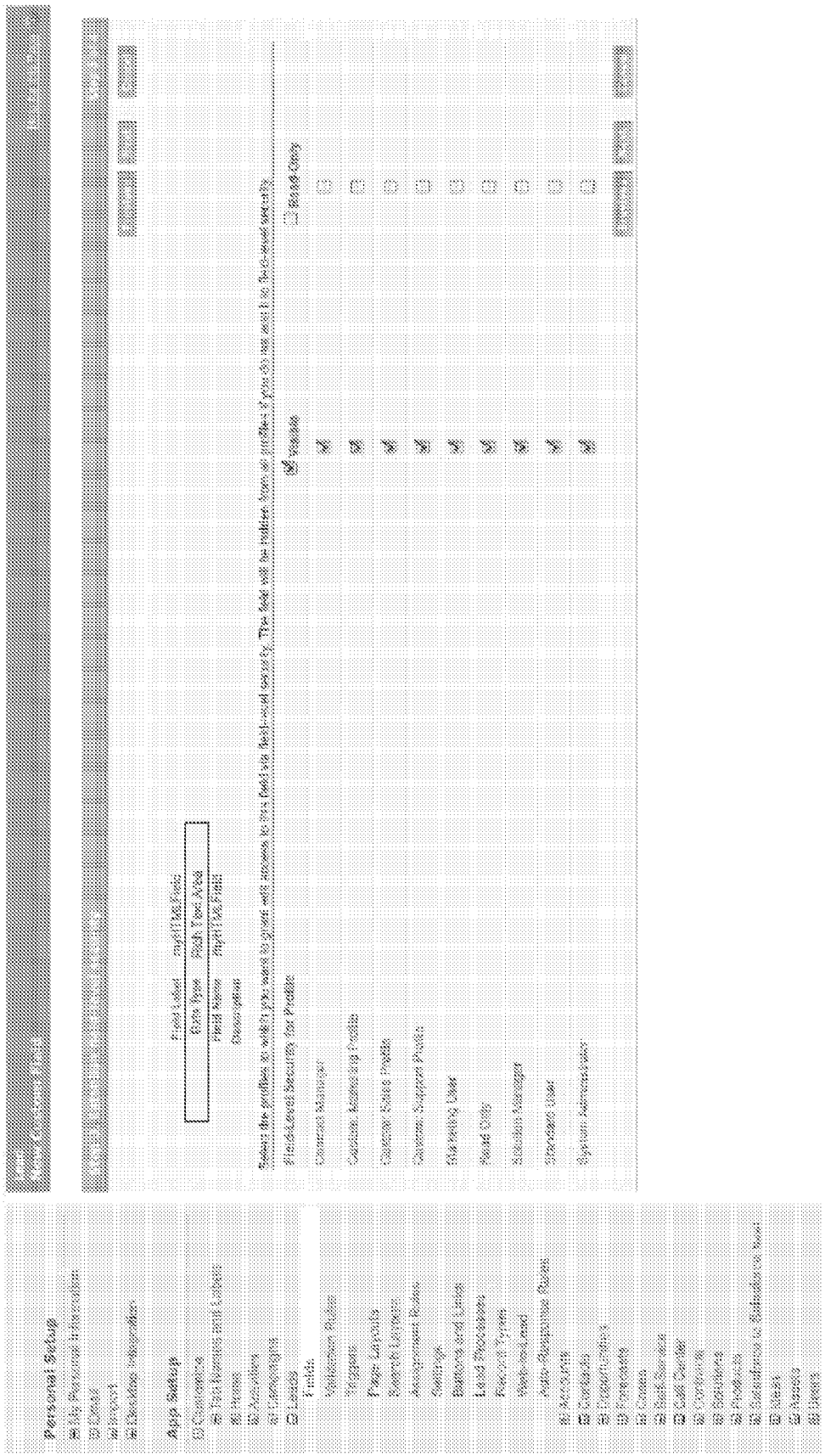

FIG. 5C shows a screenshot for the configured field of FIGS. 5A and/or 5B which may be used to configure permissions for editing (or optionally other types of access to) contents of the field. As shown, various types of users (i.e. according to user role) may be selected for being allowed editing permissions with respect to the field.

Figure 5D:
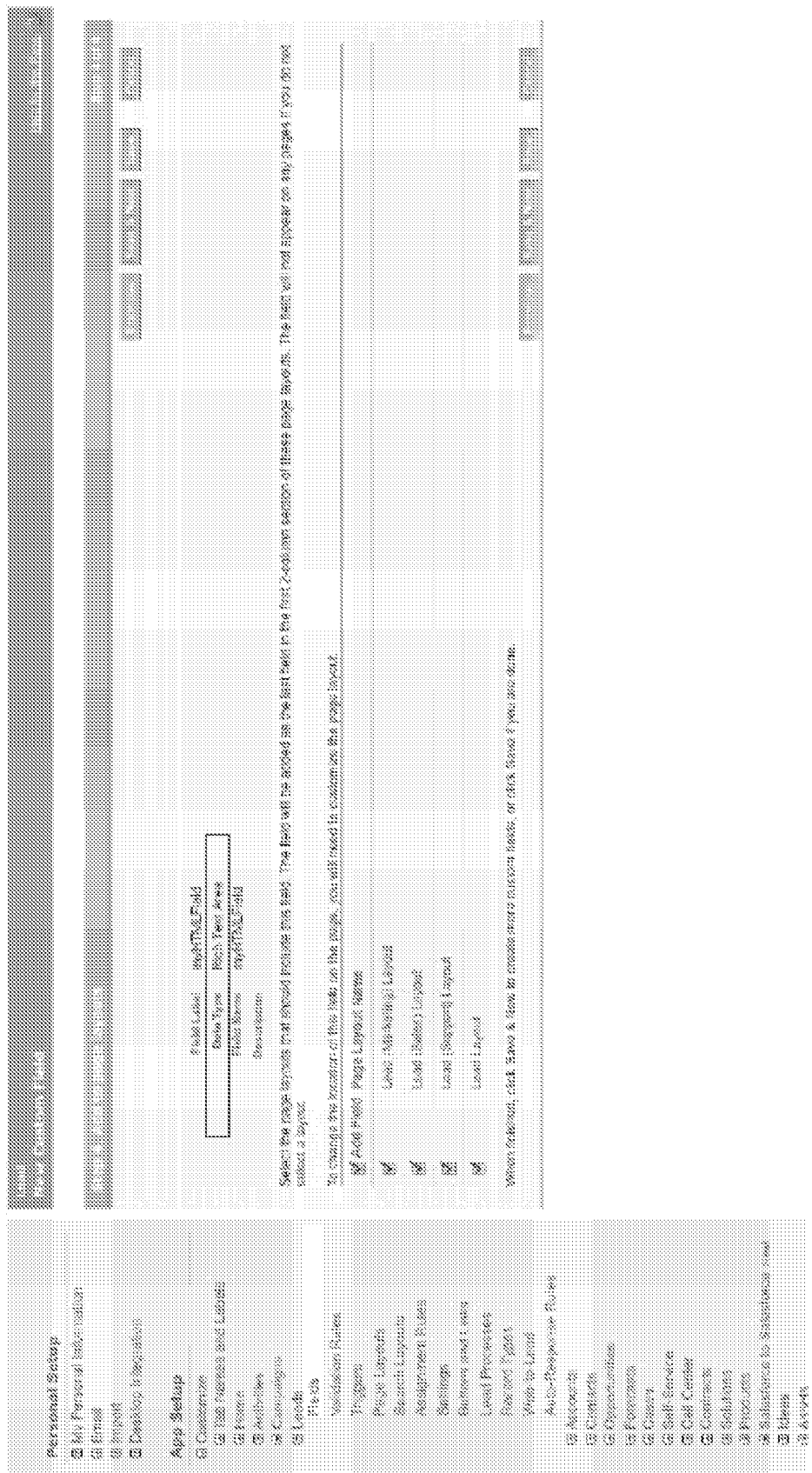

FIG. 5D shows a screenshot for selecting which of a plurality of existing entities are to include the contents of the field. The existing entities may include entities created by a tenant who is configuring the field. In the embodiment shown, each entity may include a page layout for a different type of contact.

Figure 5E:
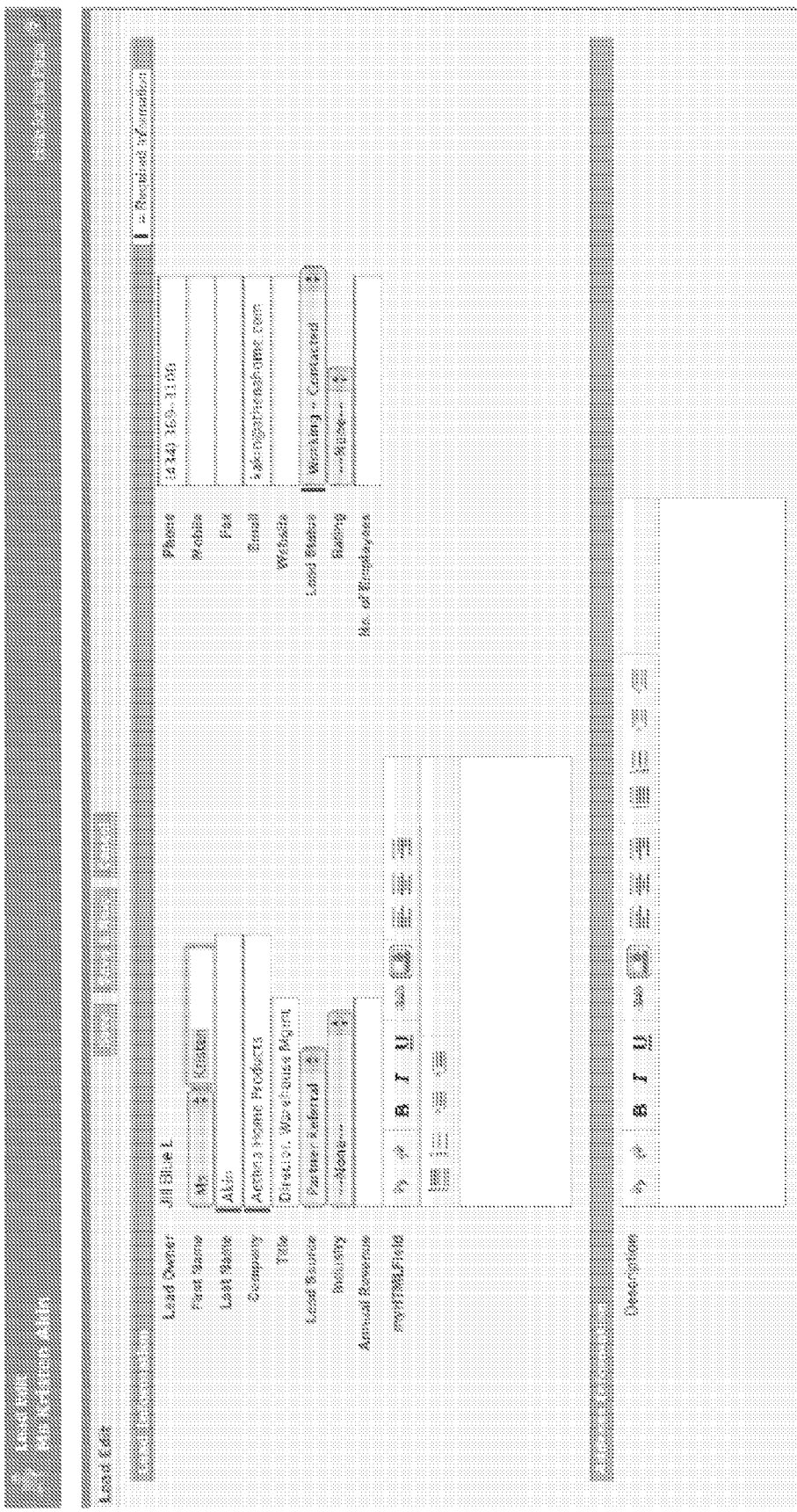

FIG. 5E shows a screenshot for receiving content from a user for storage in the configured field. In the embodiment shown, the myHTMLField provides a set of tools for formatting text entered in a text box. The formatted text may then be saved in the configured field (e.g. in a rich text area format).

FIG. 5F shows a screenshot for updating a configuration of a field. As shown, the details entered with respect to FIG. 5B may be modified, the permissions configured with respect to FIG. 5C may be modified, etc.

System Overview

Figure 6:
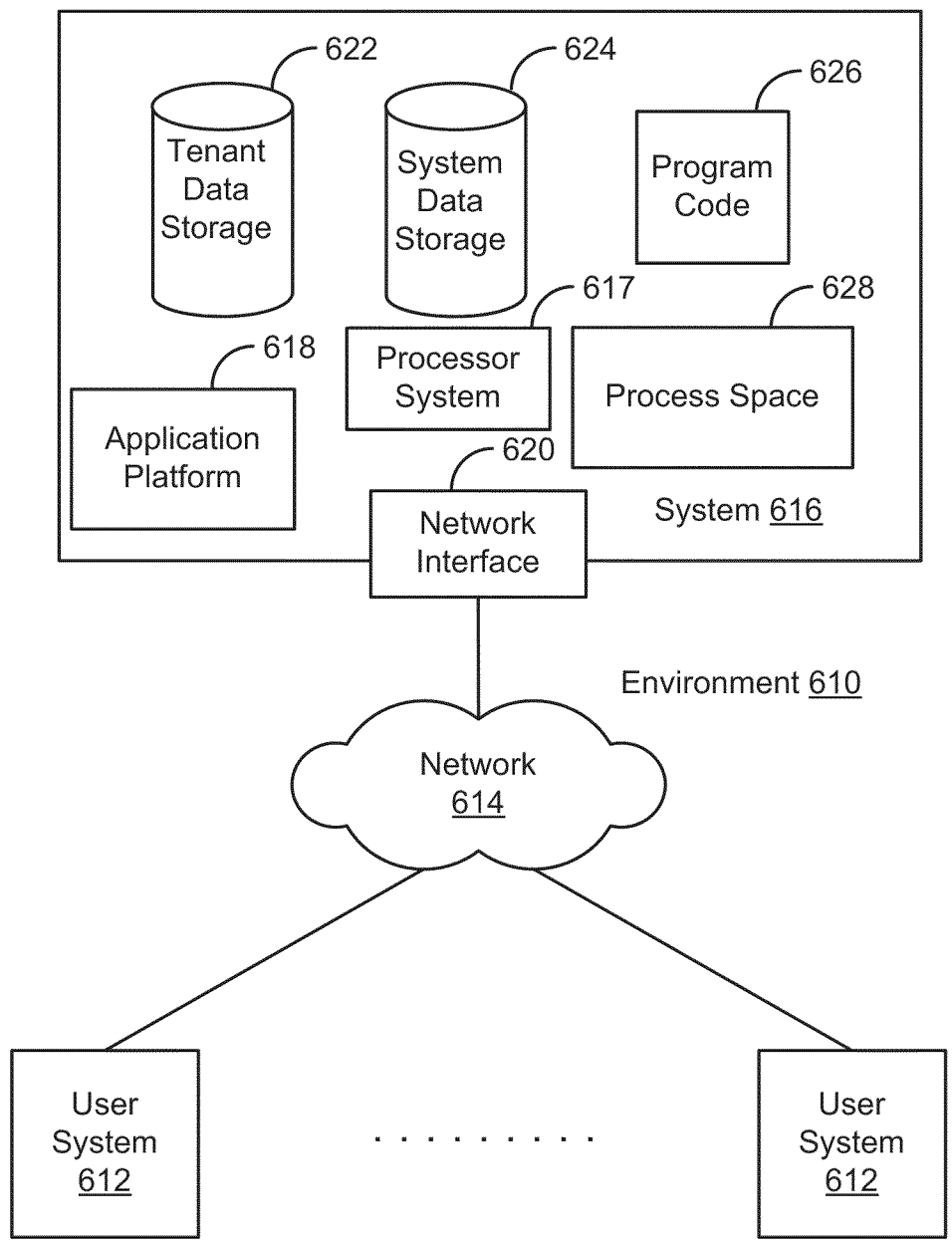
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices.

As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
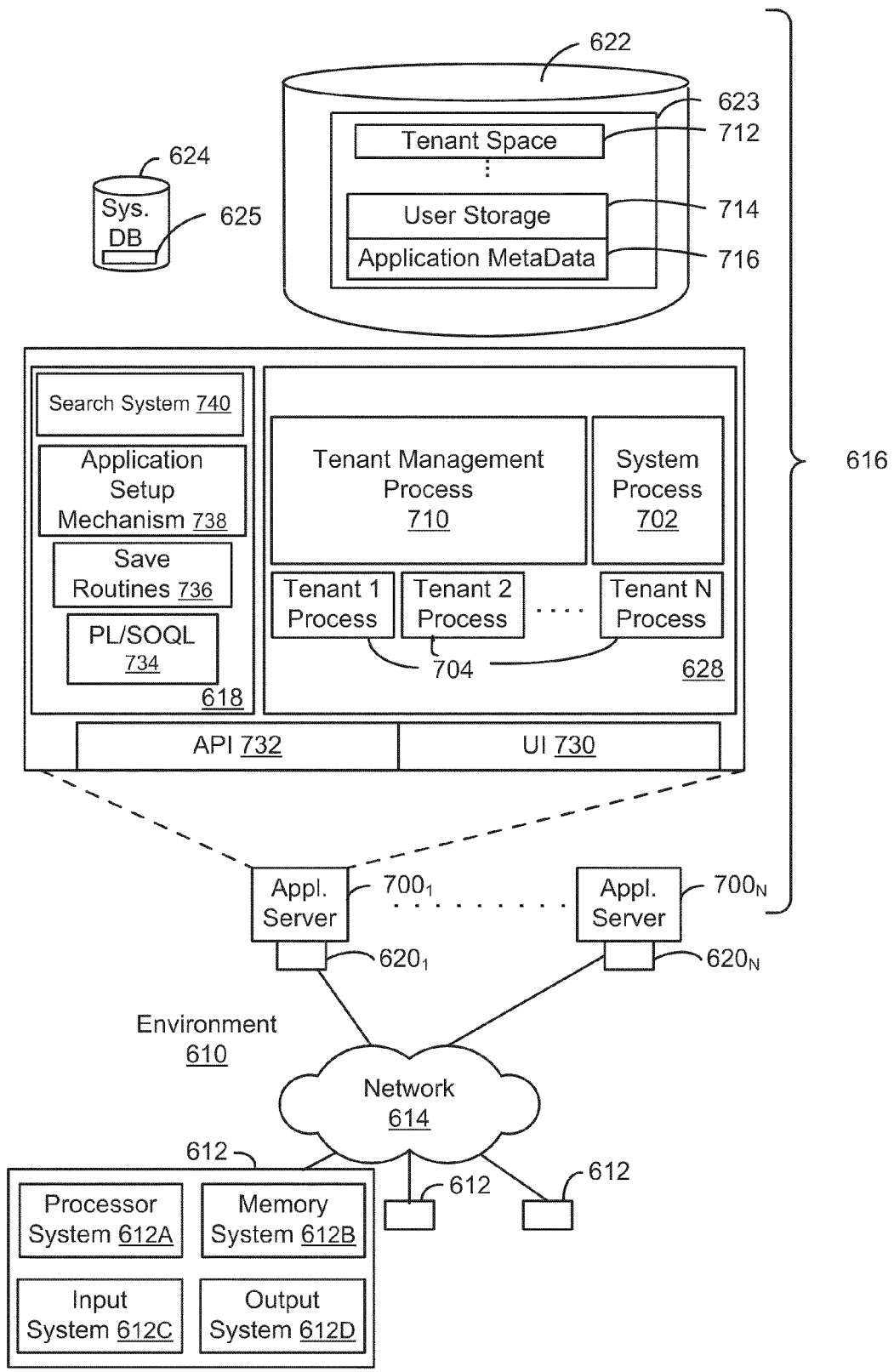
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. As an option, the application platform 618 may further include a search system 740. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method, the method comprising:
   providing a multi-tenant database system that is shared by multiple tenants, wherein content of one tenant is kept logically separate from content of other tenants; receiving content at the multi-tenant database system from one of the tenants of the multi-tenant database system for storage thereof in the multi-tenant database system, the received content being in a first format;
   determining whether a database of the multi-tenant database system supports the first format of the received content;
   in response to determining that the database supports the first format of the received content, storing the received content in the database;
   in response to determining that the database does not support the first format of the received content:
determining whether a copy of the received content is stored in a file server of the multi-tenant database system that is separate from the database, and
   (i) in response to determining that the copy of the received content is not stored in the file server:
      storing the received content in the file server separate from the database,
      storing, in the database separate from the file server, a first instance of metadata referencing a location of the stored content in the file server,
      configuring a counter specific to the stored content to an initial value, wherein the counter is of a number of instances of metadata in the database referencing the location of the stored content in the file server, and
      enabling access by the tenant to the stored content in the file server via the first instance of the metadata, and
   (ii) in response to determining that the copy of the received content is stored in the file server:
      storing, in the database separate from the file server, a second instance of metadata referencing the location of the stored content in the file server,
      incrementing the counter specific to the stored content, and
      enabling access by the tenant to the stored content in the file server via the second instance of the metadata,
   receiving at the multi-tenant database system from the tenant a request that the stored content be converted from the first format to a second format different from the first format,
   in response to receiving the request, converting the stored content in the file server from the first format to the second format and converting a field of the file server storing the stored content from being configured to store content of the first format to being configured to store content of the second format,
   for each instance of the metadata in the database referencing the location of the stored content in the file server, setting a flag included in the metadata to indicate that a type of the stored content has been changed;
   wherein the multi-tenant database system limits an amount of content allowed to be stored by each tenant in the multi-tenant database system to a maximum amount, and wherein content stored in the file server by a particular tenant and referenced by multiple instances of metadata is counted once against the maximum amount allowed to be stored by the particular tenant.

2. The computer program product of claim 1, wherein the received content includes a file.

3. The computer program product of claim 2, wherein the file includes an image file.

4. The computer program product of claim 1, wherein the stored content in one of the first format and the second format includes rich text.

5. The computer program product of claim 1, wherein the content is received using a graphical user interface used for configuring a webpage.

6. The computer program product of claim 1, wherein storing, in the database, the first instance of metadata referencing the location of the stored content in the file server includes storing an identifier of the location of the received content in a reference table of the database.

7. The computer program product of claim 6, wherein the identifier of the location of the stored content is stored in association with a content identifier.

8. The computer program product of claim 7, wherein the content identifier is stored in a field data table in association with a reference identifier.

9. The computer program product of claim 8, wherein the reference identifier is stored in a field of a record of an entity table, for referencing the stored content.

10. The computer program product of claim 9, wherein the entity table stores information associated with an entity including the stored content.

11. The computer program product of claim 10, wherein the entity includes a webpage.

12. The computer program product of claim 8, wherein the counter is stored in the reference table in association with the content identifier.

13. The computer program product of claim 12, further comprising updating the counter to reflect one less instance of metadata in the database in response to deletion of one of the instances of metadata in the database, and preventing a deletion of the stored content from the file server if the counter indicates that at least one of the instances of metadata is stored in the database.

14. The computer program product of claim 1, wherein accessing the stored content includes retrieving the stored content for inclusion in an entity provided to a user requesting the entity.

15. The computer program product of claim 1, wherein the receiving content is stored in the file server in response to a determination that the received content does not include malicious content.

16. The computer program product of claim 1, further comprising storing additional metadata associated with the stored content and retrieving or filtering the additional metadata using a query.

17. The computer program product of claim 1, further comprising:
   storing the metadata referencing the location of the stored content in a first table of the database, where the metadata is stored in association with a first instance of a unique identifier of the stored content;
   storing a second instance of the unique identifier of the stored content in association with a first instance of a reference identifier within a second table, where the second instance of the unique identifier stored in the second table points to the first instance of the unique identifier stored in the first table; and storing a second instance of the reference identifier within a field of a record of a third table, where the second instance of the reference identifier stored in the third table points to the first instance of the reference identifier stored within the second table.

18. The computer program product of claim 17, further comprising storing a type of the stored content in the field of the record.

19. The computer program product of claim 17, wherein the stored content is accessed utilizing the second instance of the reference identifier within the field of the record.

20. The computer program product of claim 1, wherein metadata referencing the location of the stored content in the file server is stored in a field of a table of the database in which the stored content would otherwise be stored if supported by the database.

21. The computer program product of claim 1, wherein when the stored content stored in the file server by the particular tenant is referenced by other tenants using the multiple instances of metadata, then the stored content stored in the file server is only counted once against the maximum amount allowed to be stored by the particular tenant.

22. The computer program product of claim 1, further comprising:
  after converting the stored content from the first format to the second format, receiving at the multi-tenant database system from the tenant a subsequent request that the stored content be converted back to the first format from the second format,
  in response to receiving the subsequent request, converting the stored content in the file server from the second format to the first format and converting a field of the file server storing the stored content from being configured to store content of the first format to being configured to store content of the first format, and
  for each instance of the metadata in the database referencing the location of the stored content in the file server and having the flag indicating that the type of the stored content has been changed, removing the flag responsive to converting the stored content in the file server from the second format to the first format.

23. The computer program product of claim 1, wherein the multi-tenant database system supports a bulk conversion of content in the file server, including:
  receiving at the multi-tenant database system from the tenant a bulk conversion request to convert content in a specified field of the file server from the first format to the second format,
  in response to receipt of the bulk conversion request, finding all data rows of the file server that have a non-null value for the specified field,
  converting all of the content in the found data rows from being in the first format to being in the second format and converting the specified field of the file server from being configured to store content of the first format to being configured to store content of the second format,
  for each instance of the metadata in the database referencing the location of the content in the file server, setting a flag included in the metadata to indicate that a type of the content has been changed.

24. A method, comprising:
  providing a multi-tenant database system that is shared by multiple tenants, wherein content of one tenant is kept logically separate from content of other tenants;
  receiving content at the multi-tenant database system from one of the tenants of the multi-tenant database system for storage thereof in the multi-tenant database system, the received content being in a first format;
  determining whether a database of the multi-tenant database system supports the first format of the received content;
  in response to determining that the database supports the first format of the received content, storing the received content in the database;
  in response to determining that the database does not support the first format of the received content:
  determining whether a copy of the received content is stored in a file server of the multi-tenant database system that is separate from the database, and
  (i) in response to determining that the copy of the received content is not stored in the file server:
  storing the received content in the file server separate from the database,
    storing, in the database separate from the file server, a first instance of metadata referencing a location of the stored content in the file server,
    configuring a counter specific to the stored content to an initial value, wherein the counter is of a number of instances of metadata in the database referencing the location of the stored content in the file server, and
    enabling access by the tenant to the stored content in the file server via the first instance of the metadata, and
  (ii) in response to determining that the copy of the received content is stored in the file server:
    storing, in the database separate from the file server, a second instance of metadata referencing the location of the stored content in the file server,
    incrementing the counter specific to the stored content, and
    enabling access by the tenant to the stored content in the file server via the second instance of the metadata,
  receiving at the multi-tenant database system from the tenant a request that the stored content be converted from the first format to a second format different from the first format,
  in response to receiving the request, converting the stored content in the file server from the first format to the second format and converting a field of the file server storing the stored content from being configured to store content of the first format to being configured to store content of the second format,
  for each instance of the metadata in the database referencing the location of the stored content in the file server, setting a flag included in the metadata to indicate that a type of the stored content has been changed;
  wherein the multi-tenant database system limits an amount of content allowed to be stored by each tenant in the multi-tenant database system to a maximum amount, and wherein content stored in the file server by a particular tenant and referenced by multiple instances of metadata is counted once against the maximum amount allowed to be stored by the particular tenant.

25. An apparatus, comprising:
a processor; and
a memory storing instructions which when executed by the processor cause the processor to perform a method comprising:
  providing a multi-tenant database system that is shared by multiple tenants, wherein content of one tenant is kept logically separate from content of other tenants;

receiving content at the multi-tenant database system from one of the tenants of the multi-tenant database system for storage thereof in the multi-tenant database system, the received content being in a first format;

determining whether a database of the multi-tenant database system supports the first format of the received content;

in response to determining that the database supports the first format of the received content, storing the received content in the database;

in response to determining that the database does not support the first format of the received content:

determining whether a copy of the received content is stored in a file server of the multi-tenant database system that is separate from the database, and (i) in response to determining that the copy of the received content is not stored in the file server:

storing the received content in the file server separate from the database, storing, in the database separate from the file server, a first instance of metadata referencing a location of the stored content in the file server, configuring a counter specific to the stored content to an initial value, wherein the counter is of a number of instances of metadata in the database referencing the location of the stored content in the file server, and enabling access by the tenant to the stored content in the file server via the first instance of the metadata, and (ii) in response to determining that the copy of the received content is stored in the file server:

storing, in the database separate from the file server, a second instance of metadata referencing the location of the stored content in the file server, incrementing the counter specific to the stored content, and enabling access by the tenant to the stored content in the file server via the second instance of the metadata, receiving at the multi-tenant database system from the tenant a request that the stored content be converted from the first format to a second format different from the first format, in response to receiving the request, converting the stored content in the file server from the first format to the second format and converting a field of the file server storing the stored content from being configured to store content of the first format to being configured to store content of the second format, for each instance of the metadata in the database referencing the location of the stored content in the file server, setting a flag included in the metadata to indicate that a type of the stored content has been changed; wherein the multi-tenant database system limits an amount of content allowed to be stored by each tenant in the multi-tenant database system to a maximum amount, and wherein content stored in the file server by a particular tenant and referenced by multiple instances of metadata is counted once against the maximum amount allowed to be stored by the particular tenant.

* * * * *